US 12,149,148 B2

(12) United States Patent
Stasko

(10) Patent No.: US 12,149,148 B2
(45) Date of Patent: Nov. 19, 2024

(54) ENERGY TRANSFORMER

(71) Applicant: Slavomir Stasko, Pittsford, NY (US)

(72) Inventor: Slavomir Stasko, Pittsford, NY (US)

( * ) Notice: Subject to any disclaimer, the term of this patent is extended or adjusted under 35 U.S.C. 154(b) by 232 days.

(21) Appl. No.: 17/834,908

(22) Filed: Jun. 7, 2022

(65) Prior Publication Data

US 2023/0396140 A1    Dec. 7, 2023

(51) Int. Cl.
*H02K 53/00* (2006.01)
*H02K 7/00* (2006.01)
*H02K 49/10* (2006.01)
*H02N 11/00* (2006.01)

(52) U.S. Cl.
CPC ............ *H02K 53/00* (2013.01); *H02K 7/003* (2013.01); *H02N 11/008* (2013.01)

(58) Field of Classification Search
CPC ........ H02K 53/00; H02K 99/00; H02K 99/10; H02K 99/20; H02K 7/003; H02K 49/10; H02N 11/008
USPC ................................... 310/15, 46; 74/DIG. 9
See application file for complete search history.

(56) References Cited

U.S. PATENT DOCUMENTS

| 3,703,653 | A | * | 11/1972 | Tracy | ...................... | H02K 33/12 |
| | | | | | | 310/35 |
| 3,879,622 | A | * | 4/1975 | Ecklin | .................... | H02K 53/00 |
| | | | | | | 310/80 |
| 3,935,487 | A | * | 1/1976 | Czerniak | ................ | H02K 99/20 |
| | | | | | | 310/46 |
| 3,967,146 | A | * | 6/1976 | Howard | ............... | H02K 49/102 |
| | | | | | | 310/80 |
| 7,235,909 | B2 | * | 6/2007 | Moe | ........................ | H02K 53/00 |
| | | | | | | 310/152 |
| 7,702,703 | B2 | * | 4/2010 | Sano | ....................... | G09G 3/006 |
| | | | | | | 708/208 |

(Continued)

FOREIGN PATENT DOCUMENTS

| CN | 103138650 | * | 6/2013 | ............. H02N 11/00 |
| EP | 0244376 | | 6/1992 | |

(Continued)

OTHER PUBLICATIONS

WO 2023/239995 International Search Report for International Application PCT/US23/67213, mailed Nov. 21, 2023.

(Continued)

*Primary Examiner* — Burton S Mullins

(57) ABSTRACT

An energy transformer includes a spaced-apart pair of first magnets disposed along a first axis; a reciprocator including a support member; a reciprocator shaft disposed on the support member; a pair of second magnets, each disposed on one end of the reciprocator shaft, the pair of second magnets further disposed along a second axis within the spaced-apart pair of first magnets such that each the second magnet is configured to interface with one of the pair of first magnets in a magnetic field interaction, the second axis is coaxially disposed with respect to the first axis, the magnetic field interaction is dependent upon a distance along the first axis between a second magnet and a first magnet with which the second magnet interacts; and a pair of shields, a shield positioner for positioning the pair of shields and an input receiver for motivating the shield positioner.

27 Claims, 11 Drawing Sheets

(56) References Cited

U.S. PATENT DOCUMENTS

| | | | |
|---|---|---|---|
| 7,902,703 B2 * | 3/2011 | Ucer | H10N 15/20 |
| | | | 310/80 |
| 2006/0244327 A1 | 11/2006 | Kundel | |
| 2008/0122299 A1 | 5/2008 | Cristoforo | |
| 2012/0007448 A1 | 1/2012 | Gosvener | |
| 2015/0288236 A1 * | 10/2015 | Moore | H02K 1/27 |
| | | | 74/DIG. 9 |

FOREIGN PATENT DOCUMENTS

| | | | | |
|---|---|---|---|---|
| EP | 2732540 | * | 7/2015 | H02K 53/00 |
| WO | 2005031953 | | 4/2005 | |
| WO | 2008009220 | | 1/2008 | |
| WO | WO-2013080194 A1 * | | 6/2013 | H02K 1/34 |
| WO | WO-2017020845 A1 * | | 2/2017 | H02N 11/00 |
| WO | WO2022069668 | * | 4/2022 | H02N 11/00 |

OTHER PUBLICATIONS

WIPO Written Opinion for International Application PCT/US23/67213, opinion completed Oct. 30, 2023.

\* cited by examiner

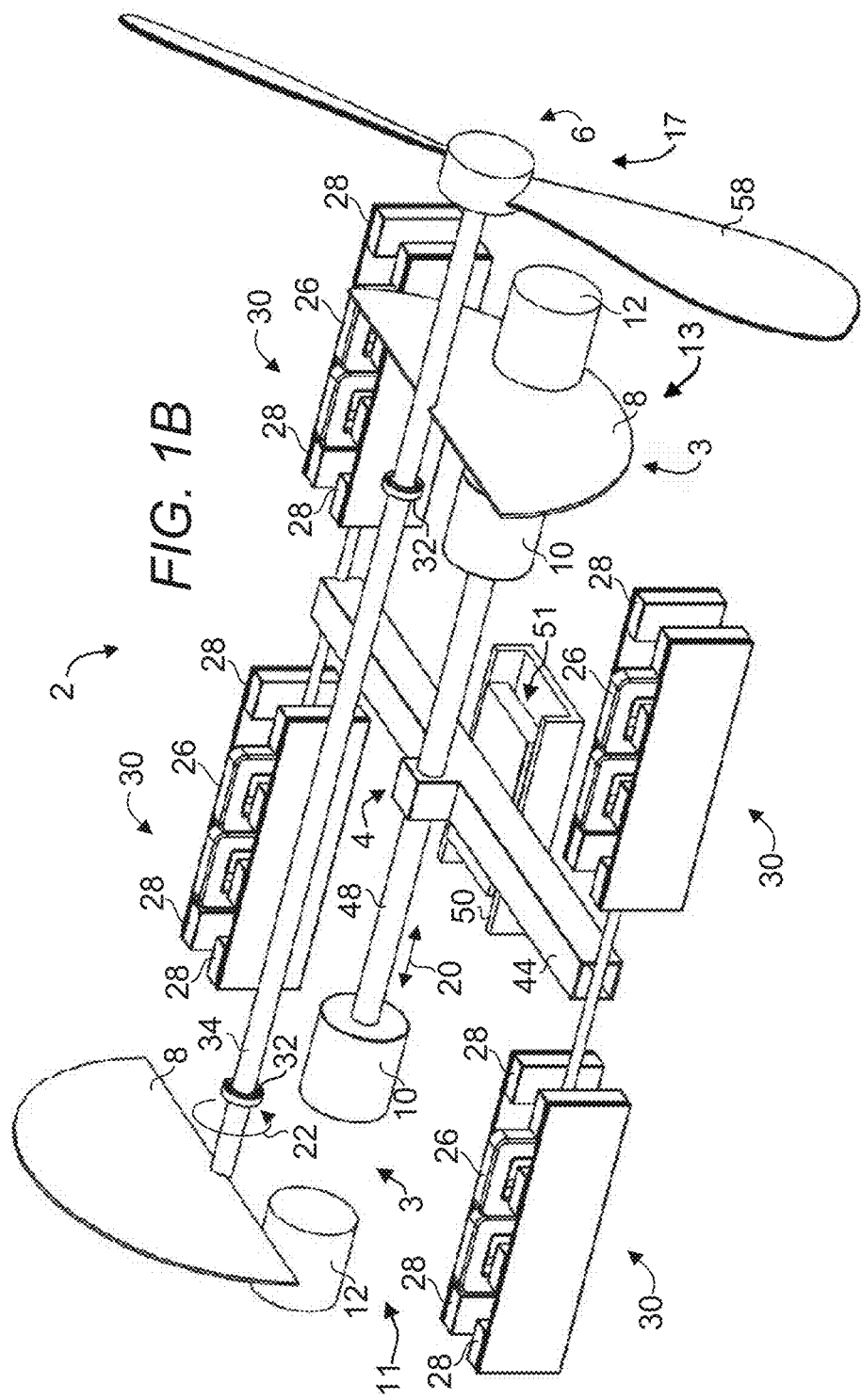

ENERGY TRANSFORMER

BACKGROUND OF THE INVENTION

1. The Field of the Invention

The present invention relates to an energy transformer. More specifically, the present invention is directed to an energy transformer that takes advantage of magnetic forces, such as repulsive magnetic forces, to maintain the motions of a reciprocator.

2. Background Art

Various energy transformers have been attempted in the past. However, little consideration has been given to the efficiency of such transformers and little to no considerations have been given to the manner in which such transformers can be adapted to receive naturally-occurring forces such as wind and hydro power to reduce the dependency on electrical inputs etc.

European Pat. Pub. No. EP0244376 B1 of Denev (Hereinafter Denev) discloses a method of producing linear reciprocating movement of a permanent bar magnet between first and second stationary permanent bar magnets, the reciprocating and stationary magnets being arranged with their magnetic axes aligned in a substantially straight line with each pole of the reciprocating magnet facing a like pole of one of the stationary magnets, in which method a first magnetic screen is periodically inserted into and withdrawn from a first air gap between the first stationary magnet and the reciprocating magnet and, in alternation therewith, a second magnetic screen is periodically inserted into and withdrawn from a second air gap between the second stationary magnet and the reciprocating magnet, whereby the reciprocating magnet is displaced towards whichever one of the air gaps has a screen inserted in it, characterized in that the first and second magnetic screens are each composed of a pair of permanent bar magnets mounted side by side in anti-parallel fashion with S-pole to N-pole and N-pole to S-pole. In Denev's device, as selective repulsions involve the use of two bar magnets disposed on a spinning shaft, Denev's device incurs a significantly higher mass to be rotated and expending significantly more energy to cause such a rotation. Denev is silent regarding providing additional mass to its reciprocator to further enhance the momentum of its reciprocator.

WIPO publication WO2005031953A2 of Maeng (Hereinafter Maeng) discloses a device for generating power by using a permanent magnet to minimize a force for overcoming a magnetic force when polarity of a magnet changes, by comprising a magnetic force shielding plate while causing a reciprocal movement of a piston with a magnetic and repulsive force of a permanent magnet. A power generator comprises a body comprising a slit groove and a piston permanent magnet formed with a connection bar protruding to the slit groove and connected with an apparatus for receiving power energy. Rotative plates are mounted in positions corresponding to plural rotative plate permanent magnets at equal sampling intervals to have different polarities, in order to reciprocate with the permanent magnets by a magnetic force and a repulsive force. A magnetic force shielding plate shields a magnetic force by being inserted during a rotation to change a polarity of the magnets, and transmits a magnetic force between the magnets after the polarity is changed, then enables the magnets to cause a motion by a magnetic force and a repulsive force. A driver comprises a driving motor for driving the magnets and the shielding plate. Maeng uses only one magnet on one end of its reciprocator, therefore incapable of producing the level of momentum in its reciprocator to produce the level of kinetic energy in mobilizing its reciprocator as in the case of a reciprocator with two magnets each disposed on one end of the reciprocator. In Maeng's device, selective repulsion involves the use of rotating magnets, incurring a significantly higher mass to be rotated and expending significantly more energy to cause such a rotation and its device already involves more parts to orchestrate reciprocating motions of its reciprocator. Maeng is also silent regarding providing additional mass to its reciprocator to further enhance the momentum of its reciprocator.

WIPO publication WO2008009220A1 of Liu et al. (Hereinafter Liu) discloses a magnetic repulsion power machine comprising a stator, a rotor, a body of magnetic conductance material, permanent magnets having a same polarity are fixed on the stator and the rotor, before the permanent magnets of the rotor approach the permanent magnets of the stator, the body of magnetic conductance material shields the magnetic field of the stator or the rotor so that the magnetic repulsive force between the stator and the rotor does not act, when the permanent magnets of the stator move far away from the permanent magnets of the rotor, the body of magnetic conductance material is moved off rapidly, the permanent magnets of the stator opposite the permanent magnets of the rotor which have the same polarity as the stator, and the magnetic repulsive force rotates the rotor to output power. In Liu's device, the output shaft of device causes rotary motions rather than linear reciprocating motions. Liu is also silent regarding providing adding mass to its reciprocator to further enhance the momentum of its reciprocator.

There exists a need for a low-loss and simple energy transformer capable of transforming reciprocating motions into electric power generated in a power generator coupled to the reciprocating motions.

SUMMARY OF THE INVENTION

In accordance with the present invention, there is provided a system for transforming energy from one form to another, the system including: (a) a spaced-apart pair of first magnets disposed along a first axis; (b) a reciprocator including: (i) a support member; (ii) a reciprocator shaft disposed on the support member; and (iii) a pair of second magnets, each disposed on one end of the reciprocator shaft, the pair of second magnets further disposed along a second axis within the spaced-apart pair of first magnets such that each the second magnet is configured to interface with one of the pair of first magnets in a magnetic field interaction, the second axis is coaxially disposed with respect to the first axis, the magnetic field interaction is dependent upon a distance along one of the first axis and the second axis between a second magnet and a first magnet with which the second magnet interacts; and (c) a pair of shields, a shield positioner for positioning the pair of shields and an input receiver for motivating the shield positioner, wherein each of the pair of shields is configured to be selectively placed between a second magnet and a first magnet with which the second magnet interacts, whereby a selective disposition of each of the pair of shields by the shield positioner within its respective space between a second magnet and a first magnet with which the second magnet interacts alters the magnetic field interaction, causing the reciprocator to reciprocate.

In one embodiment, the system further includes a power generator including: (a) at least one third magnet; and (b) at least one coil, wherein one of the at least one third magnet and the at least one coil is supported by the support member of the reciprocator and if the at least one third magnet is supported by the support member of the reciprocator, the at least one third magnet is moved with the reciprocator and relative to the at least one coil such that power can be generated through the at least one coil and if the at least one coil is supported by the support member of the reciprocator, the at least one coil is configured to be moved with the reciprocator and relative to the at least one third magnet such that power can be generated through the at least one coil, whereby the selective disposition of each of the pair of shields by the shield positioner within its respective space between a second magnet and a first magnet with which the second magnet interacts alters the magnetic field interaction, causing the reciprocator to reciprocate and a relative movement between the at least one third magnet and the at least one coil such that power is generated through the at least one coil.

In one embodiment, each of the magnetic field interactions is a repulsion. In one embodiment, the at least one of the pair of shields includes ferrous materials. In one embodiment, at least one of the pair of shields includes carbon fiber, aluminum, plastic, fiberglass or any combinations thereof. In one embodiment, the support of the reciprocator includes a linear slide. In one embodiment, the linear slide is a linear bearing slide. In one embodiment, the shield positioner includes a shaft to which the pair of shields are attached and a rotational input power receiver. In one embodiment, the rotational input power receiver is a gear, a propeller, a turbine configured to be attached to the shaft to which the pair of shields are attached or any combinations thereof. In one embodiment, the gear is configured to be driven by a second gear coupled to a motor. In one embodiment, at least one of the pair of shields includes a shield configured in a shape of a half circle.

An object of the present invention is to provide an energy transformer that transforms one kind of energy to another kind of energy, such as kinetic energy to electric energy.

Another object of the present invention is to provide an energy transformer that takes advantage of the selective use of permanent magnets to reciprocate a reciprocator, for example to generate electric power.

Another object of the present invention is to provide an energy transformer having an energy transforming rate that is adjustable by an adjustment in the rate at which an input is received at the input receiver of the energy transformer.

Whereas there may be many embodiments of the present invention, each embodiment may meet one or more of the foregoing recited objects in any combination. It is not intended that each embodiment will necessarily meet each objective. Thus, having broadly outlined the more important features of the present invention in order that the detailed description thereof may be better understood, and that the present contribution to the art may be better appreciated, there are, of course, additional features of the present invention that will be described herein and will form a part of the subject matter of this specification.

BRIEF DESCRIPTION OF THE DRAWINGS

In order that the manner in which the above-recited and other advantages and objects of the invention are obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which:

FIG. 1B is a top perspective view of another version of an energy transformer of the invention that includes a power generator and that uses magnetic repulsion;

DETAILED DESCRIPTION OF A PREFERRED EMBODIMENT

Figure 1A:
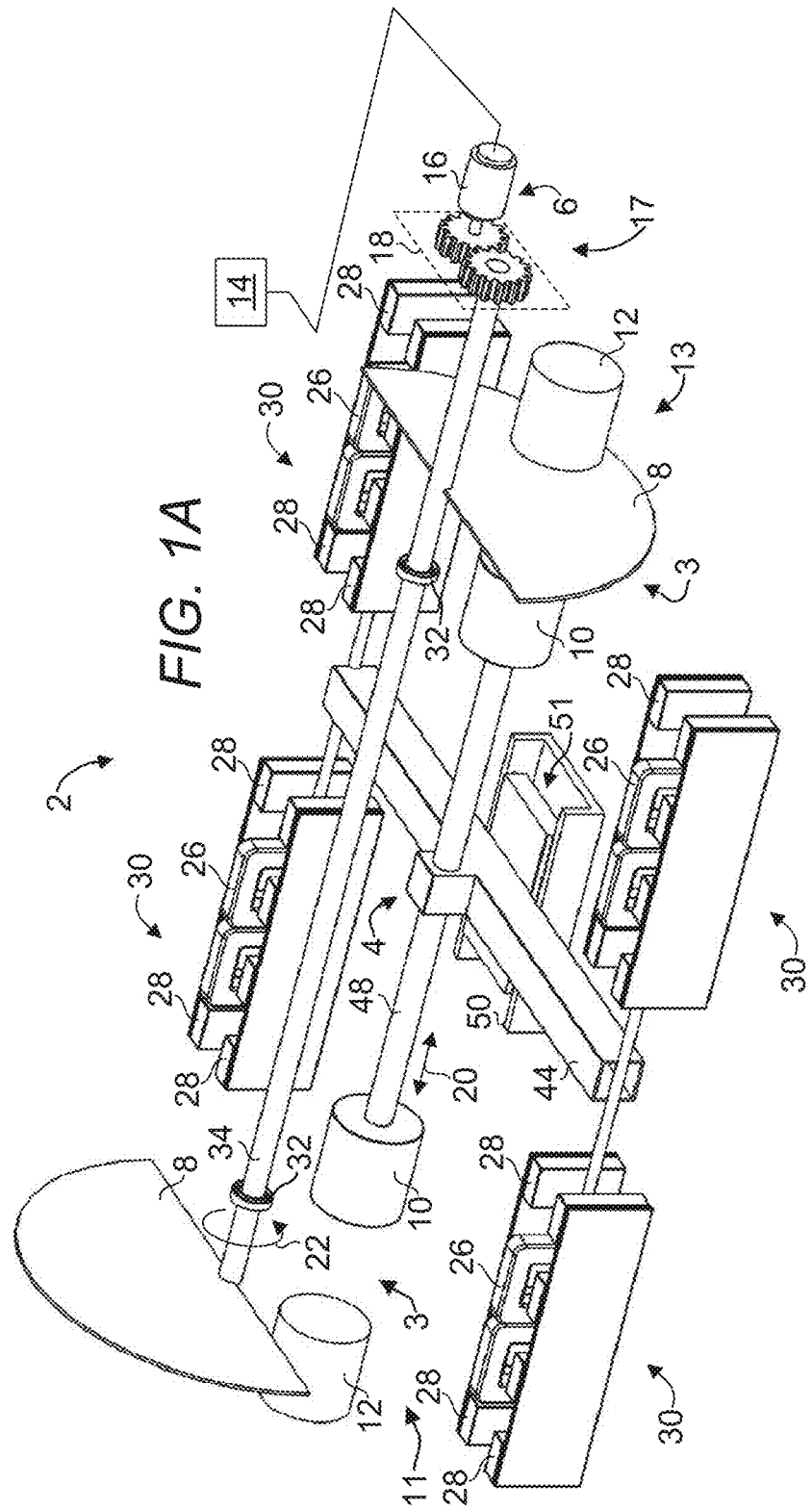
FIG. 1A is a top perspective view of a version of an energy transformer of the invention that includes a power generator and that uses magnetic repulsion.
Figure 2:
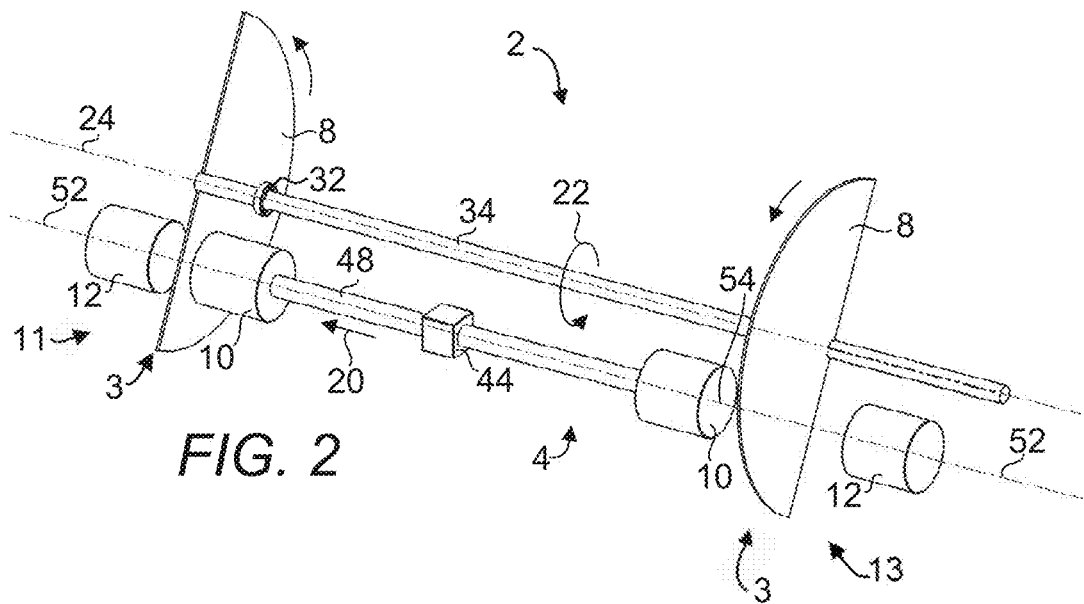
FIG. 2 is a top perspective view of an energy transformer of the invention showing the arrangements of shields with respect to a first pair of magnets and a second pair of magnets of a reciprocator in one instance of the rotation of a shaft supporting the shields.
Figure 3:
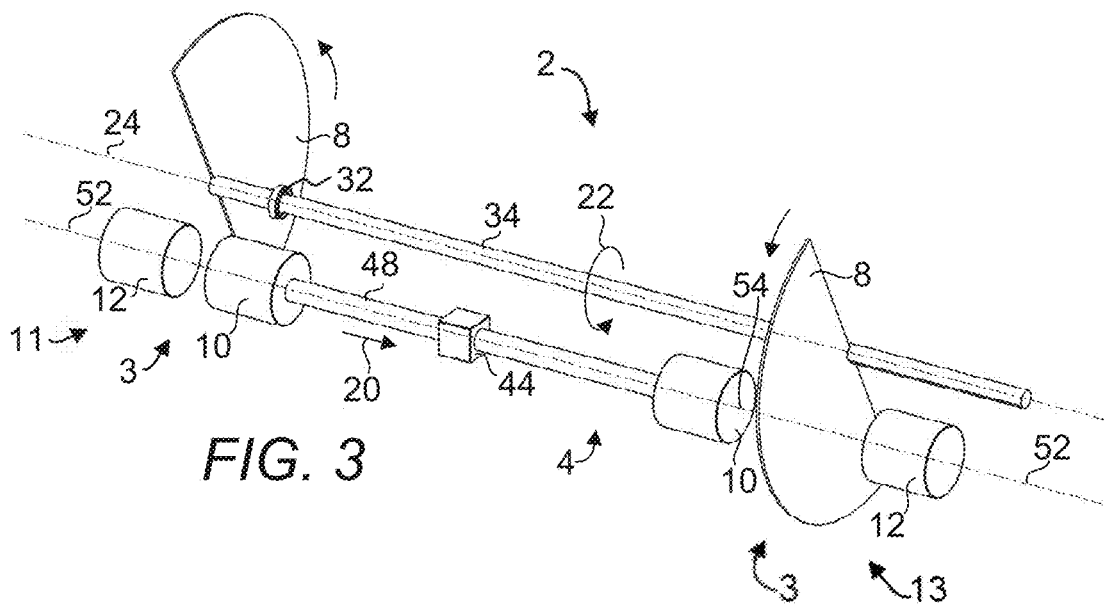
FIG. 3 is a top perspective view of an energy transformer of the invention showing the arrangements of shields with respect to a first pair of magnets and a second pair of magnets of a reciprocator in another instance of the rotation of a shaft supporting the shields.

FIG. 1A is a diagram depicting an energy transformer 2 that utilizes magnetic forces, such as magnetic repulsion, to transform rotary motion 22 to reciprocating motion 20. The energy transformer 2 includes a pair of shields 8 supported by a shield positioner, such as a shaft 34 that provides rotary motion 22 to the pair of shields 8, a first pair of magnets 12, a second pair of magnets 10, and a reciprocator 4. FIG. 2 is a top perspective view of the energy transformer 2 showing the arrangements of the pair of shields 8 with respect to the magnets 10, 12 and of the reciprocator 4 in one instance of the rotation of the shaft 34 and the pair of shields 8, and FIG. 3 shows the rotation of the shaft 34 and the pair of shields 8 in another instance. A support 50 is shown in FIG. 1A but not shown in FIG. 2 or FIG. 3. The first pair of magnets 12 are stationary relative to the support 50 and are disposed along a first axis 52. The second pair of magnets 10 are positioned on the reciprocator 4 and are disposed along a second axis 54. A repulsion controller 6 operates as a shield positioner for positioning the pair of shields 8 by communicating with an input receiver 17 that selectively motivates the shaft 34 or other shield positioner, which is supported by one or more shaft support structures 32. The shaft support structures 32 preferably allow rotation of the shaft 34 by the selective shield position controller with minimal friction.

Figure 1C:
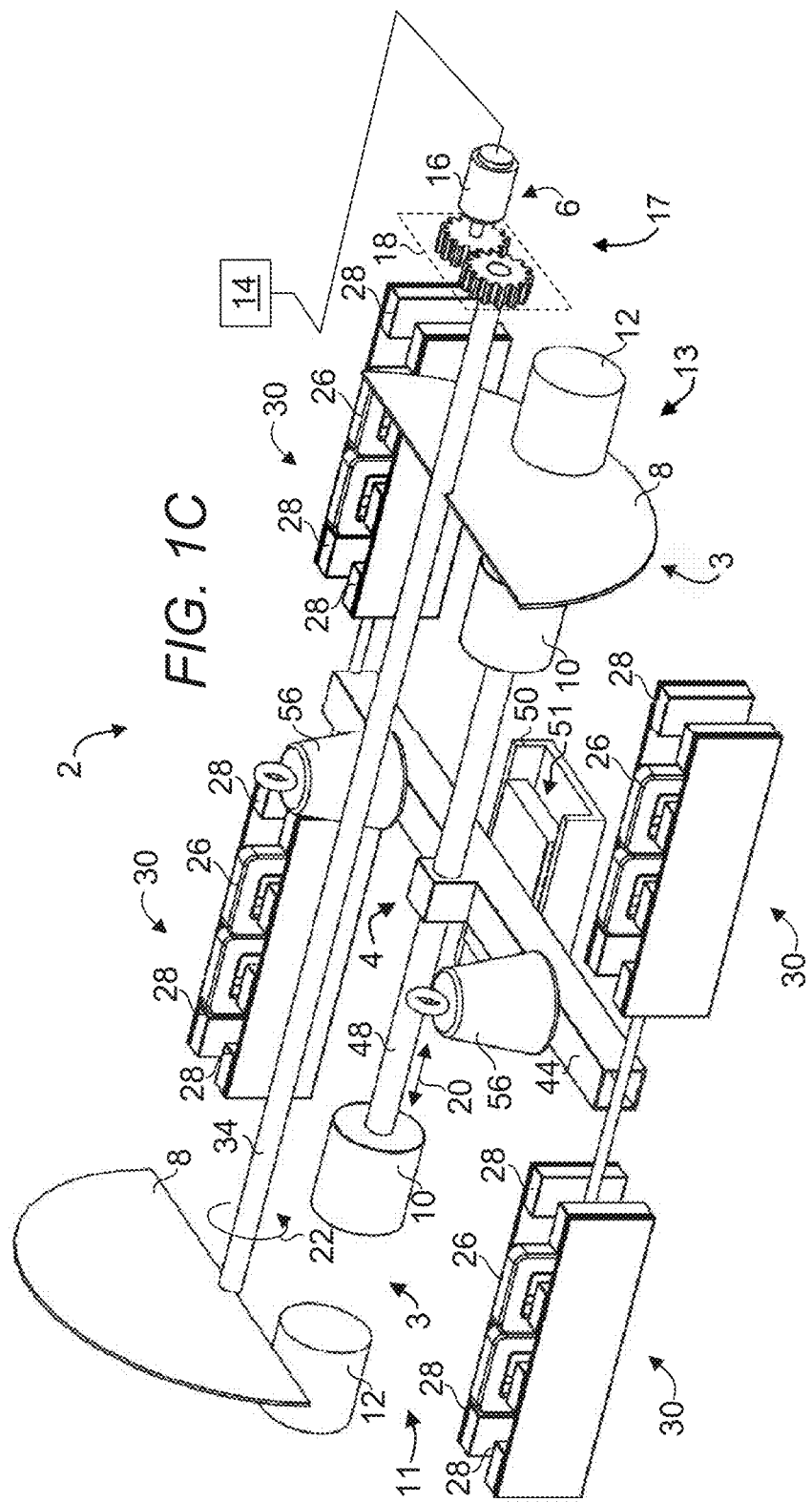
FIG. 1C is a top perspective view of another version of an energy transformer of the invention that includes a power generator using magnetic repulsion.

In one embodiment, at least one of the pair of shields 8 includes a shield configured in a shape of a half circle or half disc. With this shape, the shield 8 can be rotated entirely out of the way of a space 3 between opposing surfaces of each pair of first-second magnets. In the embodiment shown in FIG. 1A, the input receiver 17 is a gear system 18 fixedly attached to the shaft 34. The gear system 18 is configured to be driven by a motor 16 that is controlled by a motor controller 14. In other embodiments, as shown in FIG. 1B, for wind or hydro powered applications, the repulsion controller can include an input receiver 17 in the form of a propeller 58 or a turbine configured to be attached to the shaft 34 either directly with the axis of rotation of the propeller or turbine coaxially disposed with the central axis 24 of shaft 34 or indirectly with the axis of rotation of the propeller or turbine disposed in parallel with respect to the central axis 24 of shaft 34. Here, the repulsion controller 6 includes a propeller 58 configured to receive a fluid flow, e.g., a wind or water flow that is naturally occurring or forced or artificially induced. FIG. 1C is a diagram depicting an energy transformer 2 with at least one mass 56 attached to a support member 44 of the reciprocator 4 to add to the total mass of the reciprocator 4. The mass 56 can be any object, preferably a high density object, such that its volume is limited compared to its weight for simplicity in getting mounted to the reciprocator 4. When it is unfavorable or inconvenient to add more coils that represent an additional mass to the reciprocator 4, an additional mass, e.g., a metal plate, block or bell-shaped object can be attached to the reciprocator 4. This additional mass can add momentum to the reciprocator in motion, making the reciprocator 4 more able to overcome any resistance in motion that is experienced in the coils or magnets connected to the reciprocator 4.

The reciprocator 4 includes a support member 44 connected to a reciprocator shaft 48 and disposed on the support 50. The pair of second magnets 10 are, each disposed on one end of the reciprocator shaft 48. The pair of second magnets 10 is disposed along the a second axis 54 within the spaced-apart pair of first magnets 12 such that each of the second magnets 10 is configured to interface with one of the pair of first magnets 12 in a magnetic field interaction. The second axis 54 is coaxially disposed with respect to the first axis 52. The magnetic field interaction is dependent upon a distance along one of the first axis 52 and the second axis 54 between a second magnet 10 and a first magnet 12 with which the second magnet 10 interacts. Each shield 8 is configured to be selectively placed in the space 3 between a second magnet 10 and a first magnet 12 with which the second magnet 10 interacts. In use, an input is first provided to the input receiver 17 to cause a rotation of the shaft 34. Referring to FIGS. 2 and 3, this causes the shields 8 which are radially offset along the shaft 34 to be alternatingly disposed between each pair of facing first-second magnets 12, 10. In one embodiment, each of the magnetic field interactions is a repulsion as the interacting magnets are disposed at the same magnetic pole, e.g., N-pole or S-pole. Therefore, a first magnet 12 and a second magnet 10 tend to repulse one another. As the shaft 34 turns, one of the shields 8 becomes increasingly closer to the central axis 52 of the first magnets 12 while the other one of the shields 8 becomes increasingly ready to clear the axis 52. It shall be noted that, in the embodiment shown in FIGS. 1-3, the rotation of a shaft 34 determines the amount of shielding provided with each interacting pair of first-second magnets at a particular time, i.e., the placement of a shield 8 between the magnets of 10, 12 of each interacting pair of first-second magnets affects the amount of repulsion between a first magnet 12 and its interacting second magnet 10. When a shield 8 has been rotated out of the way of an associated first magnet 12 and second magnet 10, a case is represented where the magnetic effects of one magnet for the other is maximum, even if not at its maximum compared to a case where the shield is non-existent. In contrast, when the view of one first magnet 12 relative to as associated second magnet 10 has been completely blocked by a shield 8, the magnetic effects of one magnet on another is minimized, therefore allowing a reciprocating magnet that is in motion to travel relatively unimpeded by the opposing magnet. In one embodiment, the support 50 of the reciprocator includes a linear slide 51. In one embodiment, the linear slide 51 is a linear bearing slide. In all cases, the support 50 preferably exerts as little friction as possible to the reciprocator 4.

It shall be noted that, in one embodiment, upon receiving a motive force, the shaft 34 starts to rotate about axis 24, making the shields 8 rotate about the same axis. The shields 8 need not be controlled using a rotating shaft, although doing so simplifies the regulating of the placement of the shields as the shields must be advantageously placed at any moment to cause the reciprocating motion 20 of the reciprocator 4 to continue at a pace dictated by the output speed of the motor 16. Each shield 8 may alternatively be attached to an individual positioner instead, as long as the shields 8 are disposed in a coordinated manner where a first shield 8 begins to serve as a blocker between a first pair of first-second magnets 11 while a second shield 8 begins to be rotated out of the space 3 between a second pair of first-second magnets 13. Therefore, the provision of selective interactions of first and second magnets 12, 10 is not limited to a shaft to which shields are attached, the selective interactions, e.g., repulsion, of magnets can also be controlled using a selective repulsion controller 6 that controls each shield 8 individually. In one embodiment, a controller 14 is provided to control the input to be received at the input receiver 17.

In FIG. 2, it shall be noted that reciprocator shaft 48 is still assuming a motion in a direction towards to the left side of the set up as indicated by the reciprocating motion 20. However, as the shaft 34 continues to rotate as shown in FIG. 3, the repulsion exerted by the first magnet 12 of the first pair of first-second magnets 11 becomes too great for the second magnet 10 magnetically interacting with it to continue in the reciprocating motion 20 indicated in FIG. 2. Therefore in FIG. 3, the reciprocating motion 20 is shown in the opposite direction to the reciprocating motion 20 of FIG. 2.

Referring back to FIG. 1A, a power generator 30 is shown with coils 26 and magnets 28 functionally coupled to the coils 26. The support member 44 is configured to support the coils 26 and is connected to reciprocator shaft 48. As the reciprocator shaft 48 oscillates between the first magnets 12, the support member 44 oscillates with the shaft 48, causing a relative motion of a coil 26 with respect to the magnets 28, generating a current in each of the coils 26 by electromagnetic induction.

Figure 4:
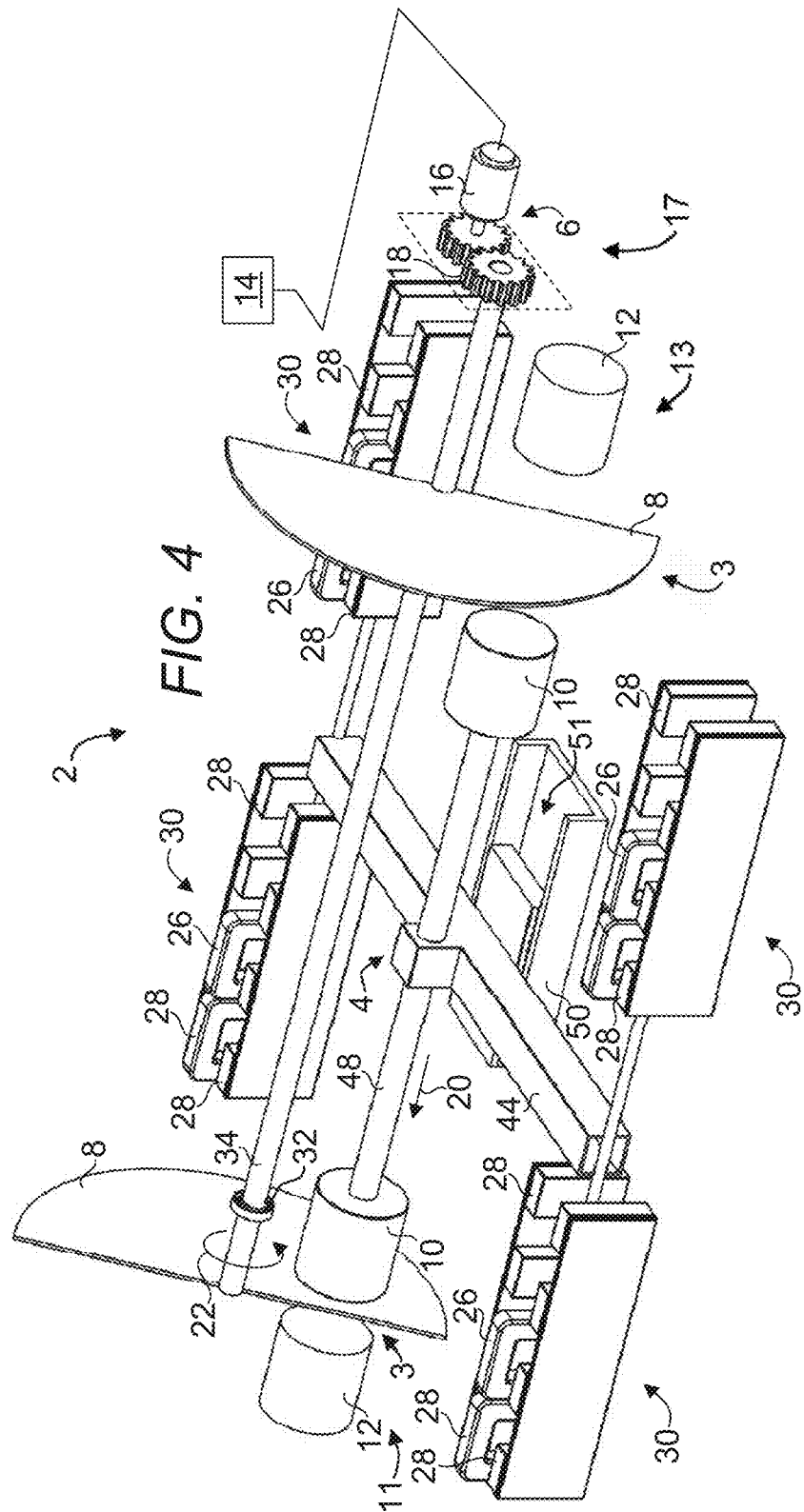
FIG. 4 is a top perspective view of an energy transformer of the invention that includes a power generator showing the arrangements of shields with respect to a first pair of magnets and a second pair of magnets of a reciprocator in one instance of the rotation of a shaft supporting the shields.
Figure 5:
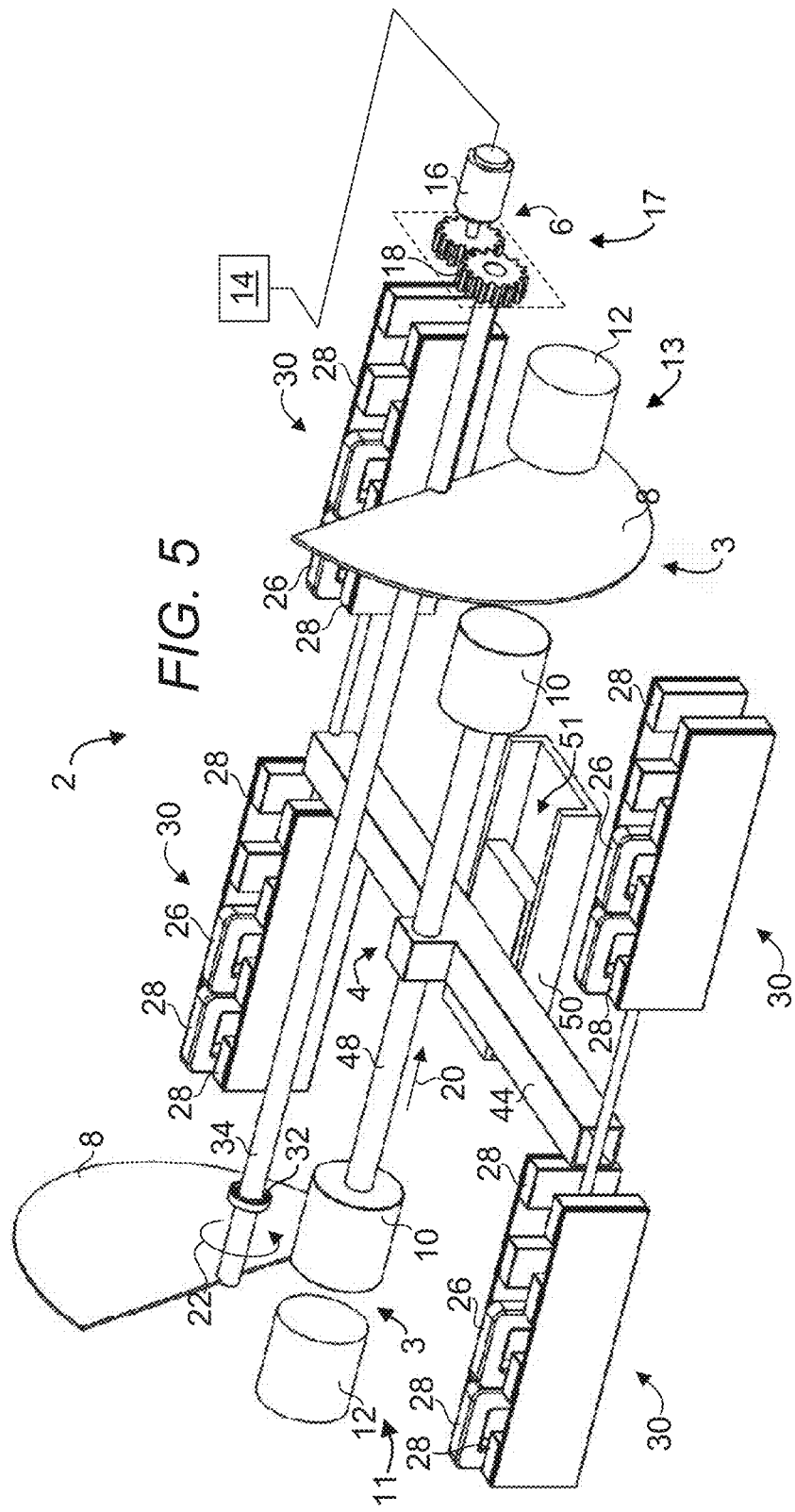
FIG. 5 is a top perspective view of an energy transformer of the invention that includes a power generator showing the arrangements of shields with respect to a first pair of magnets and a second pair of magnets of a reciprocator in another instance of the rotation of a shaft supporting the shields.
Figure 6:
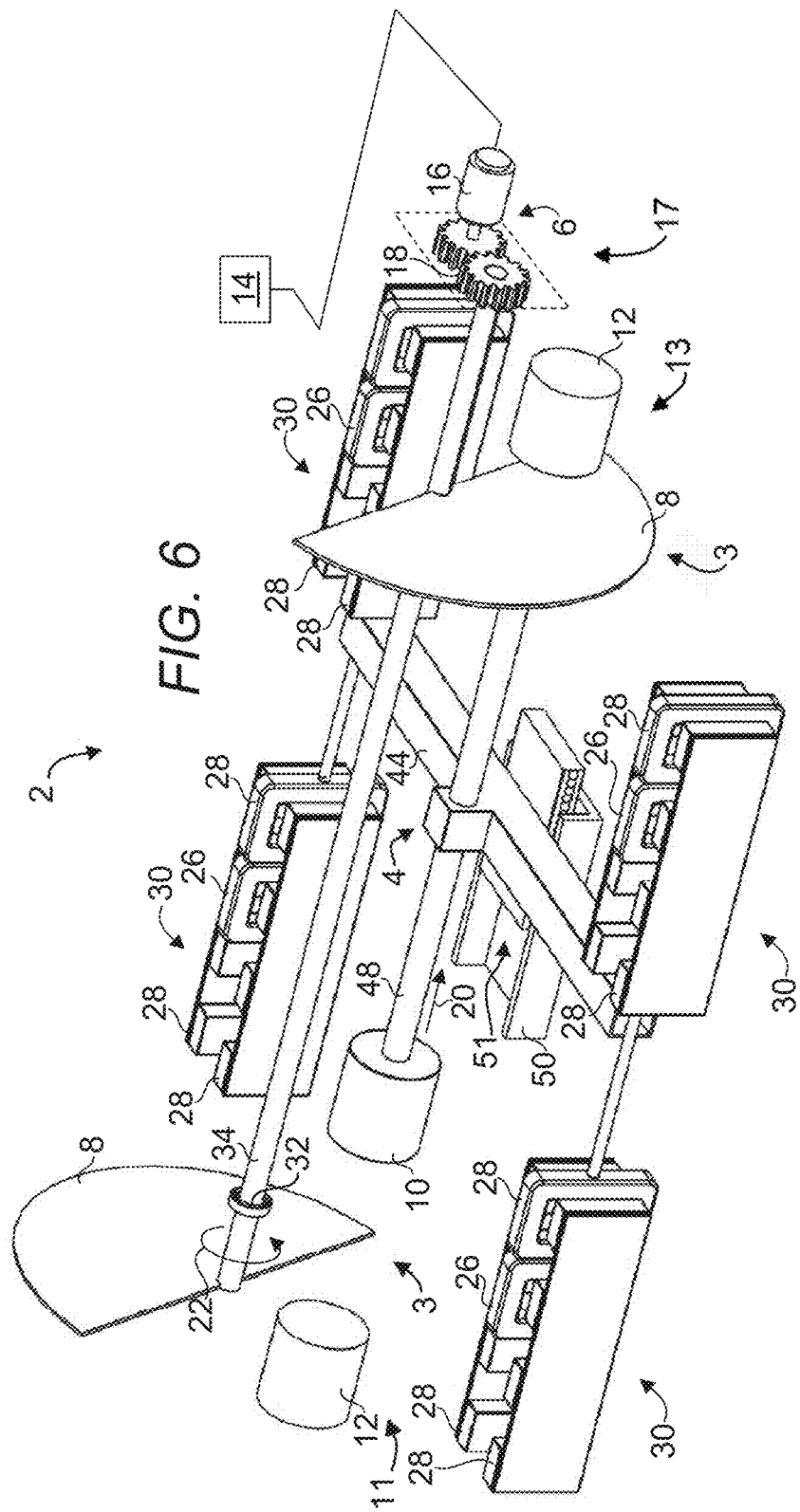
FIG. 6 is a top perspective view of an energy transformer of the invention that includes a power generator showing the arrangements of shields with respect to a first pair of magnets and a second pair of magnets of a reciprocator in one instance of the rotation of a shaft supporting the shields.
Figure 7:
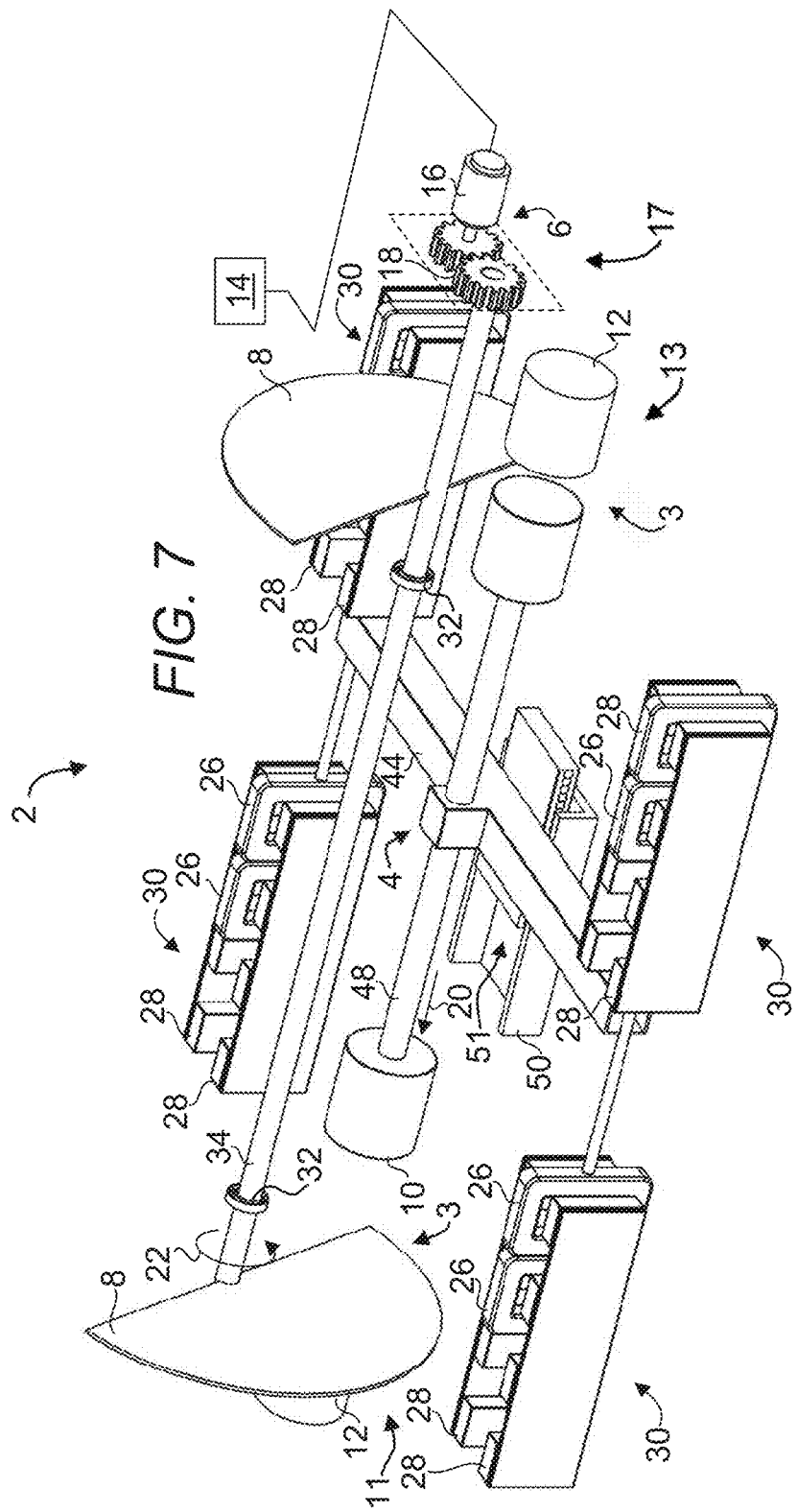
FIG. 7 is a top perspective view of an energy transformer of the invention that includes a power generator showing the arrangements of shields with respect to a first pair of magnets and a second pair of magnets of a reciprocator in another instance of the rotation of a shaft supporting the shields.

Each of FIGS. 4-7 depicts a top perspective view of the arrangements of the shields 8 with respect to the magnets 12, 10 of the energy transformer 2 in one instance of rotation of the shaft 34 supporting the shields 8. FIGS. 4-5 reiterate the conditions of FIGS. 2-3, respectively. FIGS. 6-7 each depicts a top view of the arrangements of the shields 8 with respect to the magnets 12, 10 of the energy transformer 2 in one instance of rotation of the shaft 34 supporting the shields 8 where the reciprocator 4 is disposed at the opposite end of its position shown in FIGS. 4-5. It shall be noted that coils 26 are configured in such a manner that they magnetically interact with as many magnets 28 or magnetic fields as possible in their reciprocating motions provided by the reciprocator 4 and as many pairs of magnetically interacting coils 26 and magnets 28 as possible such that as much electricity can be generated with each reciprocating motion as possible. Referring to FIG. 6, it shall be noted that the reciprocator 4 continues to travel in direction 20 to approach a first magnet 12 disposed on the right hand side. When the shield 8 on the right hand side continues in its path, it continues to alter the magnetic field interactions between the second pair of first-second magnets 13 until its motion shown in FIG. 6 is curtailed such that the reciprocator 4 is now forced to travel in the direction indicated as the reciprocating motion 20 shown in FIG. 7. In all the figures disclosed herein, the coils 26 have been shown to be attached to the reciprocator 4 at support member 44. Alternatively, the support member 44 may be attached to the magnets 28 using the a support member 44 so the magnets 28 move relative to the coils 26.

Figure 8:
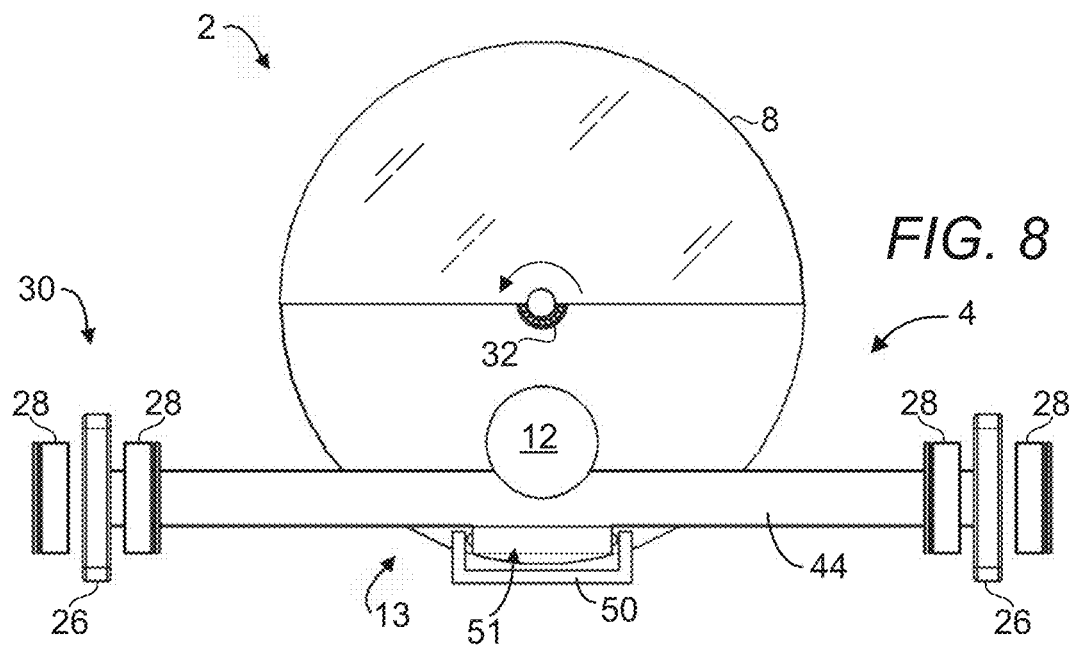
FIG. 8 is a side view of an energy transformer of the invention that includes a power generator showing a shield disposed in one position.
Figure 9:
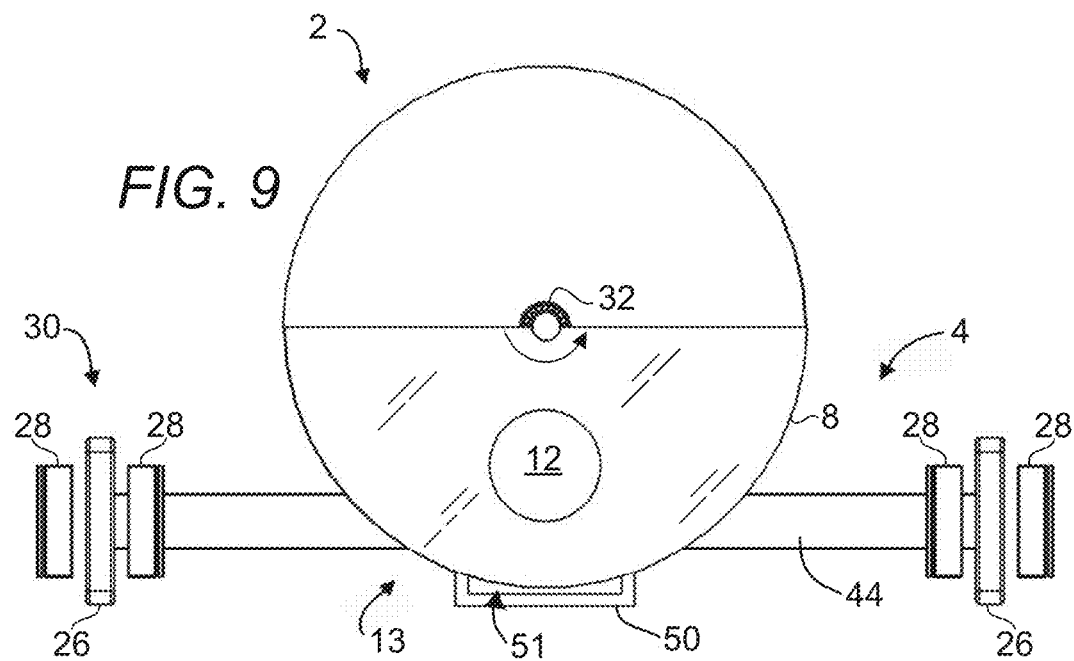
FIG. 9 is a side view of an energy transformer of the invention that includes a power generator showing a shield disposed in another position.

FIG. 8 is a side view of a shield 8 disposed in one position with respect to a magnet 12. In this position, the shield 8 does not block any magnetic fluxes through the space 3 area between the second pair of first-second magnets 13 and this position represents a position where the shield 8 exerts the least magnetic blocking effect between the second pair of first-second magnets 13. FIG. 9 is a side view of a shield disposed in another position with respect to the magnet 12. In this position, the shield 8 blocks all of the magnetic fluxes through the space 3 between the second pair of first-second magnets 13 and this position represents a position where the shield 8 exerts the maximum magnetic blocking effect between the second pair of first-second magnets 13. In one embodiment, the at least one of the pair of shields 8 includes ferrous materials. In one embodiment, at least one of the pair of shields 8 includes carbon fiber, aluminum, plastic, fiberglass or any combinations thereof. The main substrate of each shield 8 is preferably lightweight but rigid to reduce the amount of energy or effort to motivate the shield positioner and the main substrate is preferably capable of supporting a ferrous or iron-based magnetic shielding sheet. In one embodiment, the shield positioner includes a shaft 34 to which the pair of shields 8 are attached and a rotational input power receiver 17.

Figure 10:
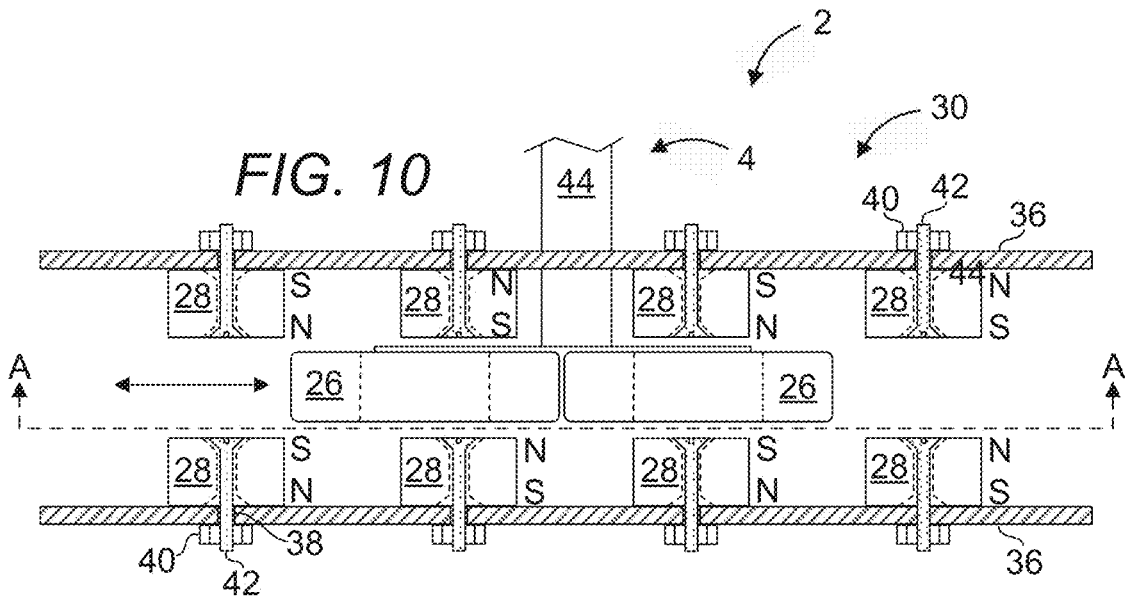
FIG. 10 is a top view of a power generator of a version of the energy transformer of the invention with coils supported on a support member and configured to be moved relative to magnets by an energy transformer of the invention for generating electricity.
Figure 11:
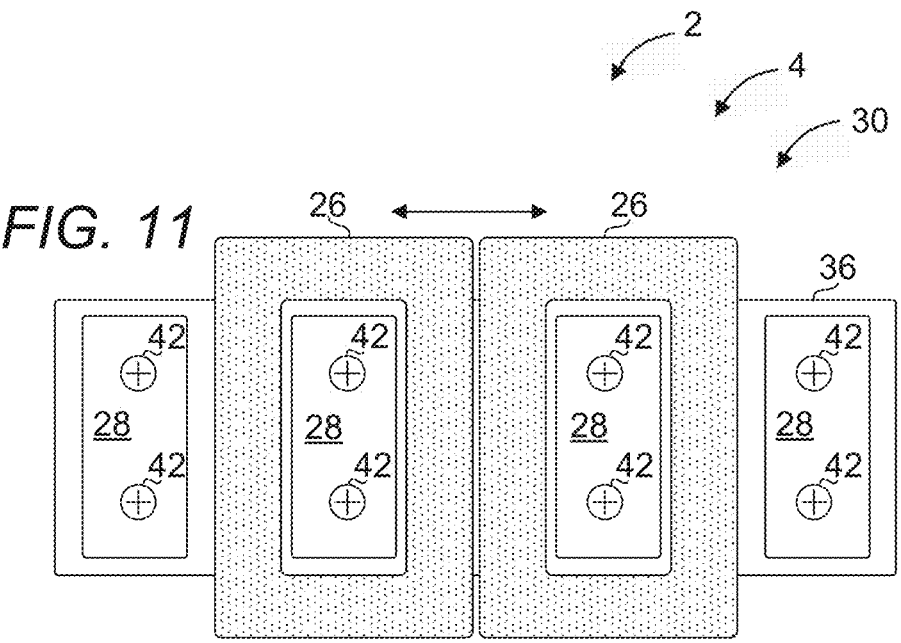
FIG. 11 is a side cross-sectional view of the power generator of FIG. 10 as taken along line A-A of FIG. 10.
Figure 12:
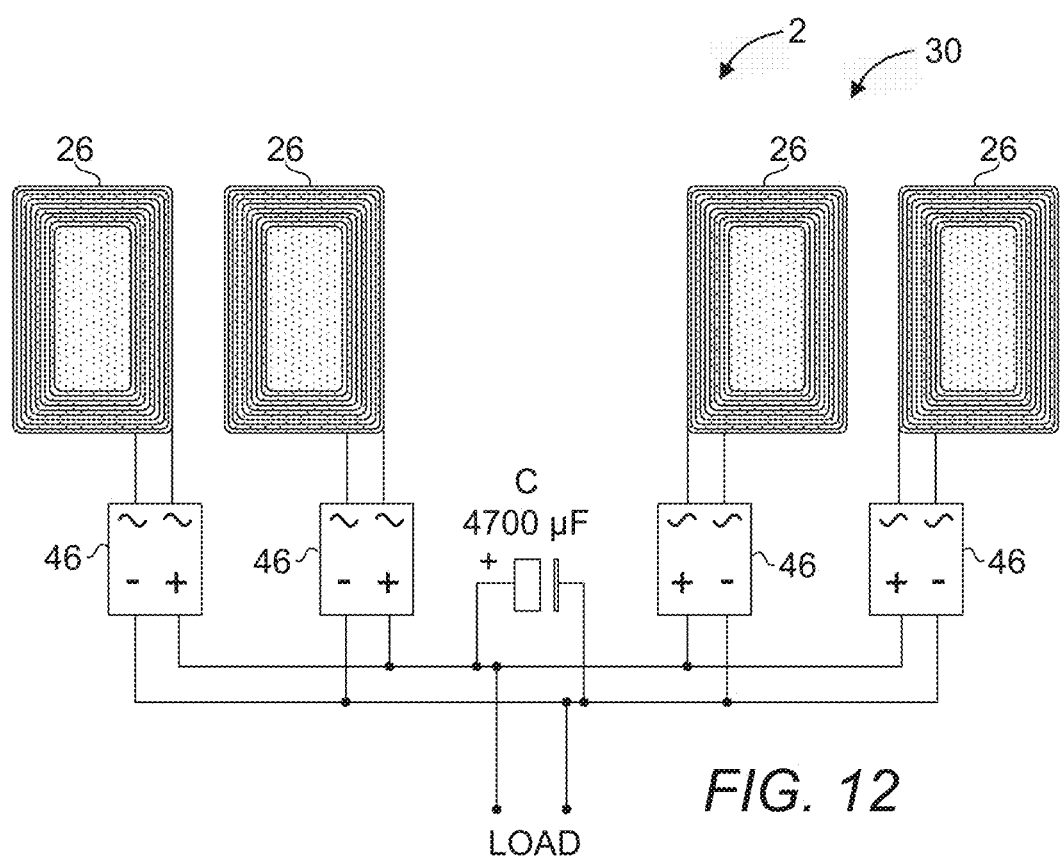
FIG. 12 is a diagram depicting the manner in which the current induced in each coil of the power generator of FIG. 10 is rectified to produce a direct current in each circuit.

FIG. 10 is a top view of a power generator 30 with coils 26 supported on the a support member 44 and configured to be moved relative to magnets 28 for generating electricity. In the embodiment shown, each power generator is a linear axial flux electricity generator as the motion afforded by the reciprocator 4 and the support member 44 is a linear motion. Magnets 28 are secured to two plates 36 by means of fasteners, e.g., screws 42, nuts 40 and holes 38 disposed on the plates 36. FIG. 11 is a side cross-sectional view of the power generator 30 of FIG. 10 as taken along line A-A of FIG. 10. FIG. 12 is a diagram depicting the manner in which the current induced in each coil 26 is rectified to produce a direct current in each circuit. The magnets 28 are disposed in their stationary positions while the coils 26 are allowed to move in a space between the two rows of magnets 28. Referring to FIG. 12, the coils each have a bridge rectifier 46 to alter an alternating current (AC) induced in the coil to direct current (DC).

The term "about" is used herein to mean approximately, roughly, around, or in the region of. When the term "about" is used in conjunction with a numerical range, it modifies that range by extending the boundaries above and below the numerical values set forth. In general, the term "about" is used herein to modify a numerical value above and below the stated value by a variance of 20 percent up or down (higher or lower).

Particular Advantages of the Invention

The present system provides an input receiver for motivating the shield positioner. The rate at which the input receiver receives an input determines the strokes of the reciprocator and therefore the rate of electric power generated by the power generator. Therefore, in an embodiment where a user of the system has control of the input, e.g., by controlling the rate of the input via a motor, the desired power generation can be altered simply by modifying the speed of the motor.

In one embodiment, a lighter component of the power generator, i.e., a coil, is attached to a moving part, i.e., a portion of the reciprocator, thereby enabling higher power generation density, as more coils can be used for power generator, per unit moving mass as compared to a case where a magnet configured for interaction with one or more coils is attached to the reciprocator as part of the moving mass.

The detailed description refers to the accompanying drawings that show, by way of illustration, specific aspects and embodiments in which the present disclosed embodiments may be practiced. These embodiments are described in sufficient detail to enable those skilled in the art to practice aspects of the present invention. Other embodiments may be utilized, and changes may be made without departing from the scope of the disclosed embodiments. The various embodiments can be combined with one or more other embodiments to form new embodiments. The detailed description is, therefore, not to be taken in a limiting sense, and the scope of the present invention is defined only by the appended claims, with the full scope of equivalents to which they may be entitled. It will be appreciated by those of ordinary skill in the art that any arrangement that is calculated to achieve the same purpose may be substituted for the specific embodiments shown. This application is intended to cover any adaptations or variations of embodiments of the present invention. It is to be understood that the above description is intended to be illustrative, and not restrictive, and that the phraseology or terminology employed herein is

What is claimed herein is:

1. An energy transformer comprising:
   (a) a spaced-apart pair of stationary first magnets disposed along a first axis;
   (b) a reciprocator comprising:
      (i) a support member;
      (ii) a reciprocator shaft disposed on the support member; and
      (iii) a pair of second magnets, each disposed on one end of the reciprocator shaft, the pair of second magnets further disposed along a second axis within the spaced-apart pair of first magnets such that each second magnet is configured to interface with one of the pair of first magnets in a magnetic field interaction, the second axis is coaxially disposed with respect to the first axis, the magnetic field interaction is dependent upon a distance along one of the first axis and the second axis between a second magnet and a first magnet with which the second magnet interacts; and
   (c) a pair of shields, a shield positioner comprising a rotatable shaft connected to each of the pair of shields and adapted to position the pair of shields, and an input receiver adapted to rotate the rotatable shaft, wherein each of the pair of shields is configured to be selectively rotated by the rotatable shaft so that it is placed between a second magnet and a first magnet with which the second magnet interacts,
   whereby a selective disposition of each of the pair of shields by the shield positioner within its respective space between a second magnet and a first magnet with which the second magnet interacts alters the magnetic field interaction, causing the reciprocator to reciprocate.

2. The energy transformer of claim 1, further comprising a power generator comprising:
   (a) at least one third magnet; and
   (b) at least one coil, wherein one of the at least one third magnet and the at least one coil is supported by the support member of the reciprocator and if the at least one third magnet is supported by the support member of the reciprocator, the at least one third magnet is moved with the reciprocator and relative to the at least one coil such that power can be generated through the at least one coil and if the at least one coil is supported by the support member of the reciprocator, the at least one coil is configured to be moved with the reciprocator and relative to the at least one third magnet such that power can be generated through the at least one coil, whereby the selective disposition of each of the pair of shields by the shield positioner within its respective space between a second magnet and a first magnet with which the second magnet interacts alters the magnetic field interaction, causing the reciprocator to reciprocate and a relative movement between the at least one third magnet and the at least one coil such that power is generated through the at least one coil.

3. The energy transformer of claim 1, wherein at least one of the pair of shields comprises ferrous materials.

4. The energy transformer of claim 1, wherein at least one of the of pair of shields comprises a material selected from the group consisting of carbon fiber, aluminum, plastic, fiberglass and any combinations thereof.

5. The system of claim 1, further comprising a support that supports the reciprocator, wherein the support of the reciprocator comprises a linear slide.

6. An energy transformer comprising:
   (a) a spaced-apart pair of first magnets disposed along a first axis;
   (b) a reciprocator comprising:
      (i) a support member;
      (ii) a reciprocator shaft disposed on the support member; and
      (iii) a pair of second magnets, each disposed on one end of the reciprocator shaft, the pair of second magnets further disposed along a second axis within the spaced-apart pair of first magnets such that each second magnet is configured to interface with one of the pair of first magnets in a magnetic field interaction, the second axis is coaxially disposed with respect to the first axis, the magnetic field interaction is dependent upon a distance along one of the first axis and the second axis between a second magnet and a first magnet with which the second magnet interacts; and
   (c) a pair of shields, a shield positioner adapted to position the pair of shields, and an input receiver adapted to motivate the shield positioner, wherein each of the pair of shields is configured to be selectively placed between a second magnet and a first magnet with which the second magnet interacts,
   (d) a support that supports the reciprocator, wherein the support of the reciprocator is a linear bearing slide, and
   whereby a selective disposition of each of the pair of shields by the shield positioner within its respective space between a second magnet and a first magnet with which the second magnet interacts alters the magnetic field interaction, causing the reciprocator to reciprocate.

7. The energy transformer of claim 1, wherein the shield positioner comprises a shaft to which the pair of shields are attached and a rotational input power receiver.

8. The energy transformer of claim 7, wherein the rotational input power receiver is a component selected from the group consisting of a gear system, a propeller, and a turbine, and wherein the rotational input power receiver is configured to be attached to the shaft to which the pair of shields are attached and any combinations thereof.

9. The energy transformer of claim 8, wherein the input power receiver is a gear system and wherein the gear system is configured to be driven by a motor.

10. The energy transformer of claim 1, wherein at least one of the pair of shields comprises a shield configured in a shape of a half circle.

11. The energy transformer of claim 1, further comprising a mass configured to be attached to the reciprocator such that the mass adds to the mass of the reciprocator.

12. An energy transformer comprising:
   (a) a spaced-apart pair of first magnets disposed along a first axis;
   (b) a reciprocator comprising:
      (i) a support member;
      (ii) a reciprocator shaft disposed on the support member; and (iii) a pair of second magnets, each disposed on one end of the reciprocator shaft, the pair of second magnets further disposed along a second axis within the spaced-apart pair of first magnets such that each the second magnet is configured to interface with one of the pair of first magnets in a magnetic field interaction, the second axis is coaxially disposed with respect to the first axis, the magnetic field interaction is dependent upon a distance along one of the first axis and the second axis between a second magnet and a first magnet with which the second magnet interacts;

(c) a pair of shields, a shield positioner adapted to position the pair of shields, and an input receiver adapted to motivate the shield positioner, wherein each of the pair of shields is configured to be selectively placed between a second magnet and a first magnet with which the second magnet interacts;

(d) a power generator comprising:
  (i) at least one third magnet; and
  (ii) at least one coil, wherein one of the at least one third magnet and the at least one coil is supported by the support member of the reciprocator and if the at least one third magnet is supported by the support member of the reciprocator, the at least one third magnet is moved with the reciprocator and relative to the at least one coil such that power can be generated through the at least one coil and if the at least one coil is supported by the support member of the reciprocator, the at least one coil is configured to be moved with the reciprocator and relative to the at least one third magnet such that power can be generated through the at least one coil;

whereby a selective disposition of each of the pair of shields by the shield positioner within its respective space between a second magnet and a first magnet with which the second magnet interacts alters the magnetic field interaction causing the reciprocator to reciprocate and a relative movement between the at least one third magnet and the at least one coil such that power is generated through the at least one coil.

13. The energy transformer of claim 12, wherein at least one of the pair of shields comprises ferrous materials.

14. The energy transformer of claim 12, wherein at least one of the pair of shields comprises a material selected from the group consisting of carbon fiber, aluminum, plastic, fiberglass and any combinations thereof.

15. The energy transformer of claim 12, wherein the support of the reciprocator comprises a linear slide.

16. The energy transformer of claim 12, wherein the shield positioner comprises a shaft to which the pair of shields are attached and a rotational input power receiver.

17. The energy transformer of claim 16, wherein the rotational input power receiver is a component selected from the group consisting of a gear system, a propeller, and a turbine, and wherein the rotational input power receiver is configured to be attached to the shaft to which the pair of shields are attached and any combinations thereof.

18. The energy transformer of claim 17, wherein the input power receiver is a gear system and wherein the gear system is configured to be driven by a motor.

19. The energy transformer of claim 12, wherein at least one of the pair of shields comprises a shield configured in a shape of a half circle.

20. The energy transformer of claim 12, further comprising a mass configured to be attached to the reciprocator such that the mass adds to the mass of the reciprocator.

21. The energy transformer of claim 1, wherein each magnetic field interaction is a repulsion.

22. The energy transformer of claim 12, wherein each magnetic field interaction is a repulsion.

23. An energy transformer comprising:
(a) a spaced-apart pair of first magnets disposed along a first axis;
(b) a reciprocator comprising:
  (i) a support member;
  (ii) a reciprocator shaft disposed on the support member; and
  (iii) a pair of second magnets, each disposed on one end of the reciprocator shaft, the pair of second magnets further disposed along a second axis within the spaced-apart pair of first magnets such that each second magnet is configured to interface with one of the pair of first magnets in a magnetic field interaction, the second axis is coaxially disposed with respect to the first axis, the magnetic field interaction is dependent upon a distance along one of the first axis and the second axis between a second magnet and a first magnet with which the second magnet interacts; and
(c) a pair of shields radially offset from one another on a shaft adapted to position the pair of shields so that the pair of shields extend at different angles from the shaft, and an input receiver adapted to motivate the shaft, wherein each of the pair of shields is configured to be selectively placed between a second magnet and a first magnet with which the second magnet interacts,
whereby a selective disposition of each of the pair of shields by the shaft within its respective space between a second magnet and a first magnet with which the second magnet interacts alters the magnetic field interaction, causing the reciprocator to reciprocate.

24. The energy transformer of claim 23, further comprising a power generator comprising:
(a) at least one third magnet; and
(b) at least one coil, wherein one of the at least one third magnet and the at least one coil is supported by the support member of the reciprocator and if the at least one third magnet is supported by the support member of the reciprocator, the at least one third magnet is moved with the reciprocator and relative to the at least one coil such that power can be generated through the at least one coil and if the at least one coil is supported by the support member of the reciprocator, the at least one coil is configured to be moved with the reciprocator and relative to the at least one third magnet such that power can be generated through the at least one coil,
whereby the selective disposition of each of the pair of shields by the shield positioner within its respective space between a second magnet and a first magnet with which the second magnet interacts alters the magnetic field interaction, causing the reciprocator to reciprocate and a relative movement between the at least one third magnet and the at least one coil such that power is generated through the at least one coil.

25. The system of claim 23, further comprising a support that supports the reciprocator, wherein the support of the reciprocator comprises a linear slide.

26. The energy transformer of claim 23, wherein at least one of the pair of shields comprises a shield configured in a shape of a half circle.

27. The energy transformer of claim 23, further comprising a mass configured to be attached to the reciprocator such that the mass adds to the mass of the reciprocator.

\* \* \* \* \*